United States Patent
Okamura

(10) Patent No.: US 8,662,976 B2
(45) Date of Patent: Mar. 4, 2014

(54) GAME PROCESSING SYSTEM, GAME PROCESSING METHOD, GAME PROCESSING APPARATUS, AND COMPUTER-READABLE STORAGE MEDIUM HAVING GAME PROCESSING PROGRAM STORED THEREIN

(75) Inventor: Yuichiro Okamura, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 11 days.

(21) Appl. No.: 13/354,085

(22) Filed: Jan. 19, 2012

(65) Prior Publication Data

US 2013/0109468 A1      May 2, 2013

(30) Foreign Application Priority Data

Oct. 28, 2011   (JP) ................................. 2011-238022

(51) Int. Cl.
A63F 13/00       (2006.01)
(52) U.S. Cl.
USPC ....................................... 463/9; 463/2; 463/7
(58) Field of Classification Search
USPC .................................................... 463/2, 7, 9
See application file for complete search history.

(56) References Cited

U.S. PATENT DOCUMENTS

2003/0166413 A1    9/2003   Hayashida et al.

FOREIGN PATENT DOCUMENTS

JP      2003-290550       10/2003

OTHER PUBLICATIONS

Tekken 6 Gameplay Lili Part 1 (PS3) Uploaded by aoshimagamer to Youtube Jan. 18, 2010.*
Star Wars: The Force Unleashed—Bull Rancor Boss Fight Uploaded by casdegroot to Youtube May 23, 2009.*
Star Wars: The Force Unleashed Multiplayer Uploaded by superwiidude to Youtube Oct. 7, 2008.*

* cited by examiner

*Primary Examiner* — Arthur O. Hall
*Assistant Examiner* — Jeffrey Wong
(74) *Attorney, Agent, or Firm* — Nixon & Vanderhye PC

(57) ABSTRACT

An exemplary game system and the like which do not impair ease of playing a game are provided. An exemplary game system for performing game processing includes: an operation processing section configured to control a player character in a virtual space on the basis of an operation of a player; a condition determination section configured to determine whether or not a positional relationship between the player character and a predetermined object meets a predetermined condition; and an adjacency processing section configured to perform a process which makes the player character less likely to be close to the object, on the basis of the determination of the condition determination section.

17 Claims, 12 Drawing Sheets

GAME PROCESSING SYSTEM, GAME PROCESSING METHOD, GAME PROCESSING APPARATUS, AND COMPUTER-READABLE STORAGE MEDIUM HAVING GAME PROCESSING PROGRAM STORED THEREIN

CROSS REFERENCE TO RELATED APPLICATION

The disclosure of Japanese Patent Application No. 2011-238022, filed on Oct. 28, 2011, is incorporated herein by reference.

FIELD

The technology disclosed herein relates to a game processing system, a game processing method, a game processing apparatus, and a computer-readable storage medium having a game processing program stored therein. Specifically, the technology disclosed herein relates to a game processing system, a game processing method, a game processing apparatus, and a computer-readable storage medium having a game processing program stored therein, for rendering a scene in which a plurality of virtual objects are located in a virtual space.

BACKGROUND AND SUMMARY

Game processing can include a process of locating a player character (or a player object) in a virtual space. A process of rendering a scene obtained by seeing the virtual space from a viewpoint different from the viewpoint of the player character in the virtual space, may be performed. An illustrative process is a process of rendering a scene for which a viewpoint (a virtual camera) is set from which viewpoint a field, in which the player character is located, is seen down.

In the case of the process of rendering a scene for which a viewpoint is set from which viewpoint the field is seen down obliquely, a situation is present where another object (e.g., an enemy character) is located between the player character and the viewpoint (virtual camera). In a scene in which such a situation is rendered, the enemy character obstructs a range of vision when the player character is seen from the viewpoint, and a player cannot recognize the position in which the player character is present.

Conventionally, in such a case, for example, as a representation method for indicating the position of the player character, a process of causing a display of the enemy character to be translucent and a process of displaying a silhouette for the purpose of indicating the position of the player character have been used.

However, when such a display process as described above is performed, it is difficult for a user to recognize what shape of a surface of the enemy character obstructing the range of vision to the player character faces the player character in the three-dimensional virtual space.

Such difficulty in recognition impairs ease of playing a game. It is a feature of certain exemplary embodiments to provide a game system and the like which do not impair ease of playing a game.

In particular, it is a feature of certain exemplary embodiments to cause the relationship between an important virtual object and a player character to easily be recognized in a progress of a game, in the case where there are many constraints in a display in which there are a plurality of player characters and another virtual object is also present.

The following technology will be described herein as illustrative embodiments for attaining the features described above.

In an illustrative aspect, a game system for performing game processing is provided. The game system includes an operation processing section, a condition determination section, and an adjacency processing section.

The operation processing section is configured to control a player character in a virtual space on the basis of an operation of a player. The condition determination section is configured to determine whether or not a positional relationship between the player character and a predetermined object meets a predetermined condition. The adjacency processing section is configured to perform a process which makes the player character less likely to be close to the object, on the basis of the determination of the condition determination section.

In one embodiment, the condition determination section may determine that the predetermined object hides the player character, on the basis of a virtual camera.

In the above embodiment, the condition determination section may determine whether or not the player character is close to the predetermined object.

In various embodiments, the game system may further comprise a transparent processing section configured to increase transparency of the object on the basis of the determination of the condition determination section.

In one embodiment, the game system may further comprise a collision determination section configured to perform a determination of collision between the player character and the object, and the adjacency processing section may make it likely to be determined by the collision determination section that the player character and the object collide with each other.

In the above embodiment, the collision determination section may perform the determination of collision by using a predetermined shape, and the adjacency processing section may increase a size of the predetermined shape.

In various embodiments, the predetermined object in the game system may be an enemy object.

In various embodiments, the operation processing section may control a plurality of player characters on the basis of operations of a plurality of players.

As used herein, the term "transparency" is a parameter which is set such that an object represented in an image rendered in the game system indicates a transparent state. Thus, the expression of "increasing" "transparency" of a rendering target means to enhance a form in which the target is transparent, as a result of the rendering. Thus, it does not have to indicate that the value of an introduced parameter corresponding to the transparency increases. For example, it may be defined that in the case where an alpha value is a value of 0.0 to 1.0, "transparence" is provided when the alpha value is 0.0, and "opacity" is provided when the alpha value is 1.0.

As used herein, the term "system" (e.g., an image processing system, a game system, or an information processing system) may include one apparatus, or may include a plurality of apparatuses each of which can communicate with any one of the apparatuses (wirelessly or via a line).

In another aspect, the above game processing system (game system) can be provided as one game processing apparatus. In still another aspect, a computer-readable storage medium having a game processing program for performing image processing in the game processing system may be provided as one embodiment. Further, as an illustrative embodiment, a method which can be implemented in the computer-readable storage medium having the above program, the apparatus, the system is provided.

As used herein, the term "computer-readable storage medium" indicates any apparatus or medium capable of storing a program, a code, and/or data to be used in a computer system. The computer-readable storage medium may be any one of a volatile device and a nonvolatile device as long as it can be read by a computer system. Examples of computer-readable storage media include, but are not limited thereto, a magnetic tape, a hard disc drive (HDD), a compact disc (CD), a digital versatile disc (DVD), a Blu-ray disc (BD), a semiconductor memory.

The game processing system and the like illustrated in the exemplary embodiment makes it easy for the player to recognize the state of the virtual object during the game processing.

These and other objects, features, aspects and advantages of certain exemplary embodiments will become more apparent from the following detailed description of certain exemplary embodiments when taken in conjunction with the accompanying drawings.

DETAILED DESCRIPTION OF NON-LIMITING EXAMPLE EMBODIMENTS

[1. Configuration of Game System]

Figure 1:
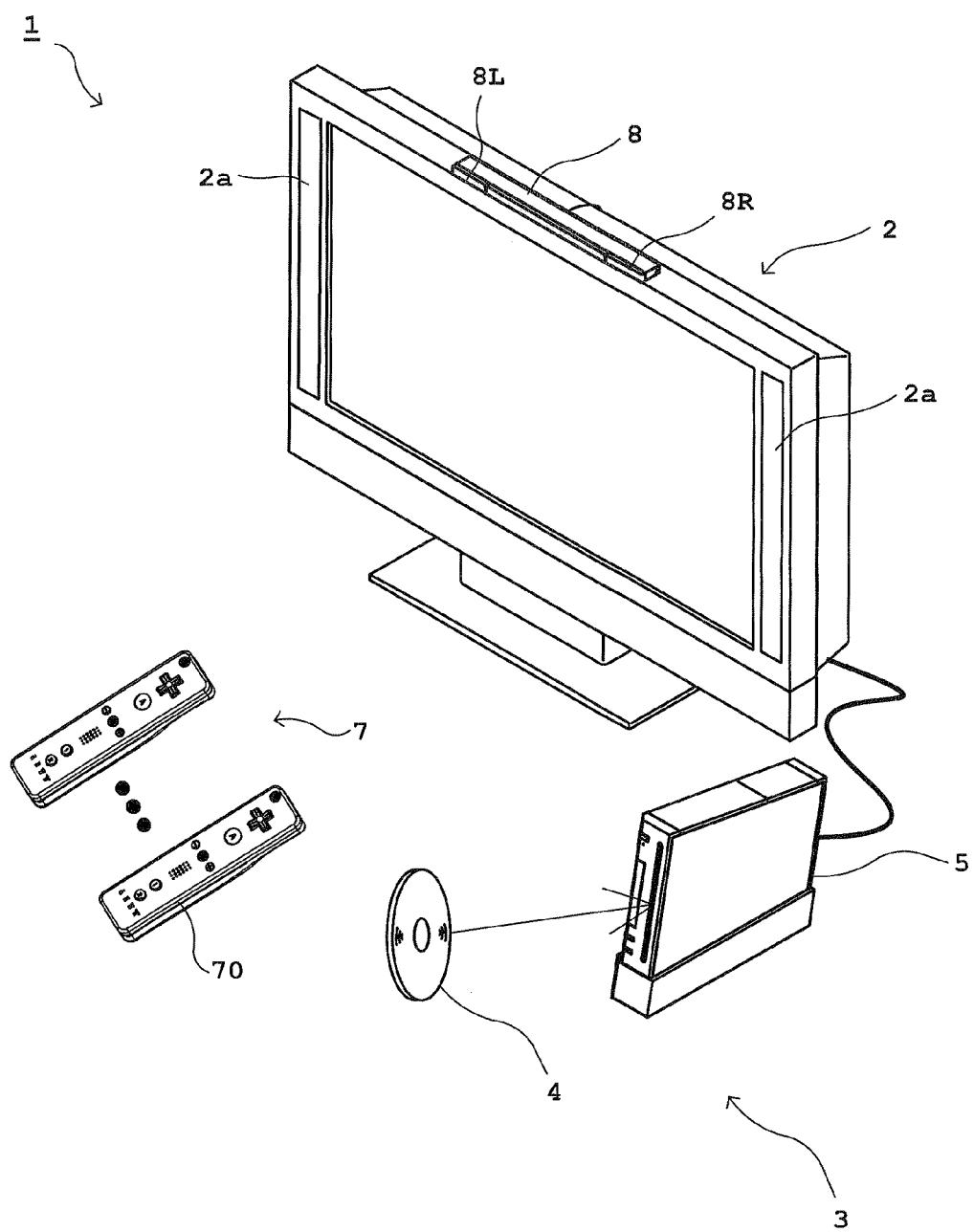
FIG. 1 is an external view showing an example non-limiting game system 1 according to an illustrative embodiment.

With reference to FIG. 1, a game processing system according to an illustrative embodiment will be described. Hereinafter, in order to give a specific description, a description will be given using, as the game processing system, a game system 1 including a stationary game apparatus body 5.

Figure 2:
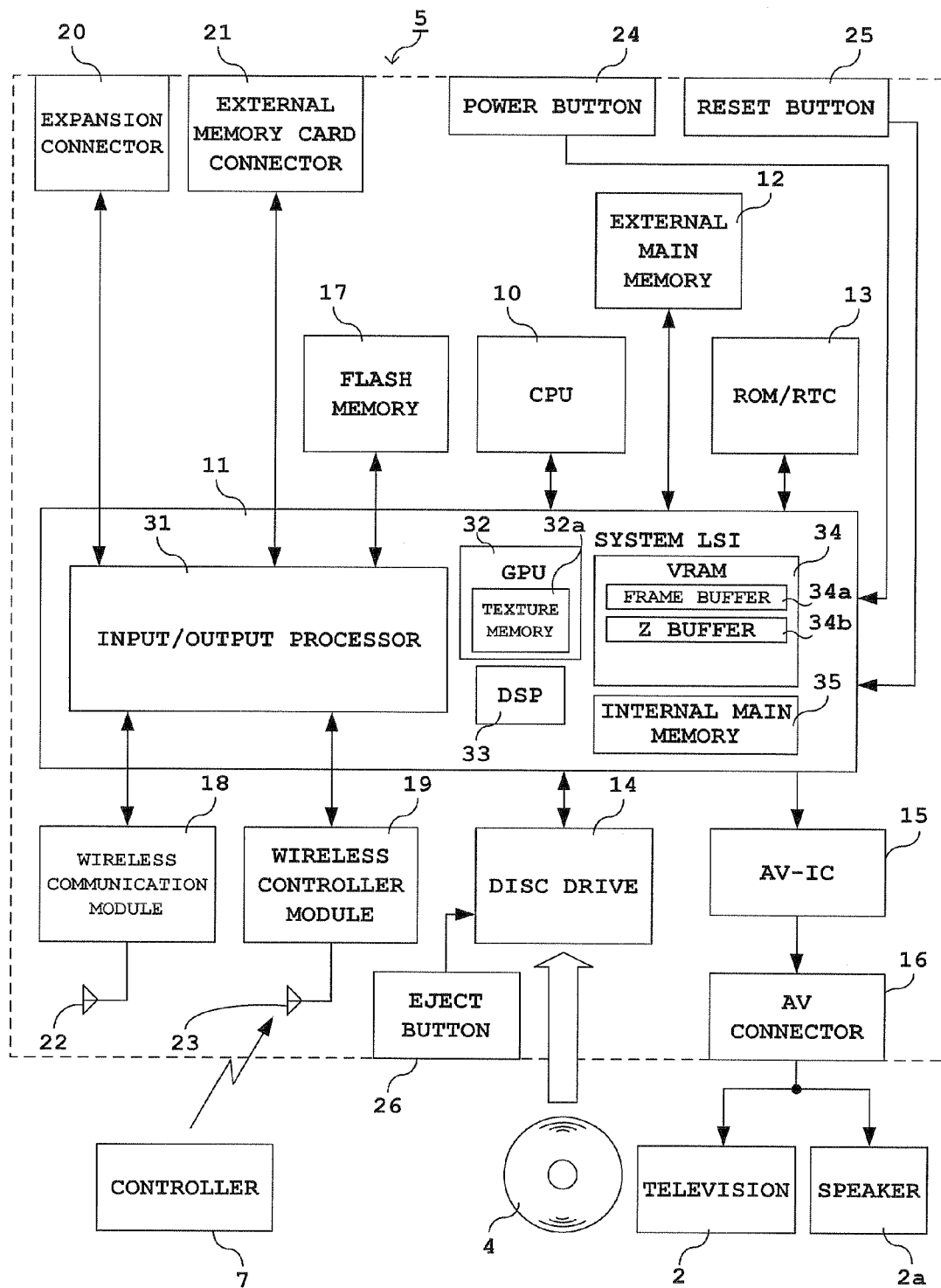
FIG. 2 is a block diagram showing a non-limiting example of a game apparatus body 5 of FIG. 1.

FIG. 1 is an external view showing an example of the game system 1 including a stationary game apparatus 3. FIG. 2 is a block diagram showing an example of the game apparatus body 5. It is noted that the drawings appended hereto are intended to illustrate the illustrative embodiment and not to limit the technical idea described herein to the specific embodiment illustrated therein.

As shown in FIG. 1, the game system 1 includes: a home-use TV receiver 2 (hereinafter, referred to as a monitor 2) which is an example of a display device; and the stationary game apparatus 3 connected to the monitor 2 via a connection cord. The monitor 2 has loudspeakers 2a for outputting, in the form of sound, an audio signal outputted from the game apparatus 3.

The game apparatus 3 includes: an optical disc 4 having stored thereon various programs and various data; the game apparatus body 5 having a computer for executing the programs of the optical disc 4 to cause the monitor 2 to output and display a game image; and a controller 7 for providing the game apparatus body 5 with operation information used for a game in which a character or the like displayed in the game screen is controlled. It is noted that a plurality of controllers 7 are illustratively shown in FIG. 1.

The game apparatus body 5 has a wireless controller module 19 therein (see FIG. 2). The wireless controller module 19 receives data wirelessly transmitted from the controller 7, and transmits data from the game apparatus body 5 to the controller 7. In this manner, the controller 7 and the game apparatus body 5 are connected by wireless communication. Further, the optical disc 4 as an example of an exchangeable information storage medium is detachably mounted on the game apparatus body 5.

On the game apparatus body 5, a flash memory 17 (see FIG. 2) is mounted, the flash memory 17 acting as a backup memory for fixedly storing such data as saved data. The game apparatus body 5 executes the programs stored in the optical disc 4, and displays a result thereof as a game image on the monitor 2. The programs to be executed may be previously stored not only in the optical disc 4, but also in the flash memory 17. The game apparatus body 5 can reproduce a state of the game played in the past, by using the saved data stored in the flash memory 17, and display a game image of the reproduced state on the monitor 2. A user of the game apparatus 3 can enjoy advancing in the game by operating the controller 7 while watching the game image displayed on the monitor 2.

By using the technology of, for example, Bluetooth (registered trademark), the controller 7 wirelessly transmits transmission data, such as operation information, to the game apparatus body 5 having the wireless controller module 19 therein.

The controller 7 include a core unit 70. The core unit 70 is operation means mainly for controlling an object or the like displayed on a display screen of the monitor 2.

The core unit 70 includes a housing, which is small enough to be held by one hand, and a plurality of operation buttons (including a cross key, a stick or the like) exposed at a surface of the housing. As described later in detail, the core unit 70 includes an imaging information calculation section 74 for taking an image of a view seen from the core unit 70. As an example of imaging targets of the imaging information calculation section 74, two LED modules 8L and 8R (hereinafter, referred to as "markers 8L and 8R") are provided in the vicinity of the display screen of the monitor 2. These markers 8L and 8R each output, for example, infrared light forward from the monitor 2.

The controller 7 (e.g., the core unit 70) is capable of receiving, via a communication section 75, transmission data wirelessly transmitted from the wireless controller module 19 of the game apparatus body 5, and generating a sound or vibration based on the transmission data.

[2. Internal Configuration of Game Apparatus Body]

The following will describe an internal configuration of the game apparatus body 5, with reference to FIG. 2. FIG. 2 is a block diagram showing the internal configuration of the game apparatus body 5. The game apparatus body 5 has a CPU (Central Processing Unit) 10, a system LSI (Large Scale Integration) 11, an external main memory 12, a ROM/RTC (Read Only Memory/Real Time Clock) 13, a disc drive 14, an AV-IC (Audio Video-Integrated Circuit) 15, and the like.

The CPU 10 performs information processing on the basis of the programs stored in the optical disc 4.

The CPU 10 is connected to the system LSI 11. In addition to the CPU 10, the external main memory 12, the ROM/RTC 13, the disc drive 14 and the AV-IC 15 are connected to the system LSI 11. The system LSI 11 performs processing such as: controlling data transfer among the components connected to the system LSI 11; generating an image to be displayed; obtaining data from external devices; and the like. An internal configuration of the system LSI 11 will be described later. The external main memory 12 that is a volatile memory stores programs and various data loaded from the optical disc 4, or various data loaded from the flash memory 17. The external main memory 12 is used as a work area or buffer area of the CPU 10. The ROM/RTC 13 has a ROM in which a boot program for the game apparatus body 5 is incorporated (so-called a boot ROM), and has a clock circuit (RTC) which counts the time. The disc drive 14 reads program data, texture data and the like from the optical disc 4, and writes the read data into a later-described internal main memory 35 or into the external main memory 12.

On the system LSI 11, an input/output processor 31, a GPU (Graphic Processor Unit) 32, a DSP (Digital Signal Processor) 33, a VRAM (Video RAM) 34, and the internal main memory 35 are provided. Although not shown, these components 31 to 35 are connected to each other via an internal bus.

The GPU 32 is a part of rendering means in the game apparatus 3, and generates an image in accordance with a graphics command (image generation command) from the CPU 10. Specifically, the GPU 32 generates game image data by, according to the graphics command, performing: calculation processing required for displaying 3D graphics, such as processing of coordinate transformation from a 3D coordinate to a 2D coordinate, which is preprocessing of rendering; and final rendering processing such as texture mapping (processing of synthesizing a color of a polygon and a color of a texture per pixel and outputting a resultant color per pixel).

More specifically, describing rasterization as an example of the functions of the GPU 32, when data per vertex (per polygon) subjected to processing such as so-called perspective transformation processing is obtained, the GPU 32 calculates each side of triangles that constitute a polygon, from the vertexes of the triangles (included in the data) ("triangle setup"), and performs processing of filling the insides of the calculated triangles (processing as a DDA (Digital Differential Analyzer)). A color obtained by interpolating color information that each vertex of the triangles has, is used for filling the insides of the triangles.

Further, the GPU 32 also serves as a rasterizer to select, for each pixel where the triangle is filled, a corresponding pixel (also referred to as texel) of an image that indicates a design. For example, when data of vertexes constituting the polygon includes information of a position to be cut out from a texture image, the GPU 32 scans the texture image on the basis of the information of the position, and calculates position information of a pixel of the texture image corresponding to each pixel to be filled.

The VRAM 34 stores data (data such as polygon data, texture data, and the like) used for the GPU 32 to execute the graphics command. The VRAM 34 includes a frame buffer 34a and a Z buffer 34b.

The frame buffer 34a is, for example, a memory for rendering or storing image data, for one frame, which is to be supplied to the monitor 2. When the later-described AV-IC 15 reads data in the frame buffer 34a at a predetermined cycle (e.g., a cycle of 1/60 sec), a three-dimensional game image is displayed on the screen of the monitor 2.

Further, the Z buffer 34b has a storage capacity corresponding to (the number of pixels (storage locations or addresses) corresponding to the frame buffer 34a) X (the bit count of depth data per pixel), and stores depth information or depth data (Z value) of a dot corresponding to each storage location in the frame buffer 34a.

The DSP 33 acts as an audio processor, and generates audio data by using sound data and sound waveform (tone) data stored in the internal main memory 35 and in the external main memory 12.

Further, similarly to the external main memory 12, the internal main memory 35 stores programs and various data and is also used as a work area or buffer area of the CPU 10.

The image data and the audio data generated in the above manner are read by the AV-IC 15. The AV-IC 15 outputs the read image data to the monitor 2 via the AV connector 16, and outputs the read audio data to the loudspeakers 2a embedded in the monitor 2. As a result, an image is displayed on the monitor 2 and a sound is outputted from the loudspeakers 2a.

The input/output processor (I/O processor) 31 performs, for example, data transmission/reception to/from components connected thereto, and data downloading from external devices. The input/output processor 31 is connected to the flash memory 17, a wireless communication module 18, the wireless controller module 19, an expansion connector 20, and an external memory card connector 21. An antenna 22 is connected to the wireless communication module 18, and an antenna 23 is connected to the wireless controller module 19.

The input/output processor 31 is connected to a network via the wireless communication module 18 and the antenna 22 so as to be able to communicate with other game apparatuses and various servers connected to the network. The input/output processor 31 regularly accesses the flash memory 17 to detect presence or absence of data that is required to be transmitted to the network. If such data is present, the input/output processor 31 transmits the data to the network via the wireless communication module 18 and the antenna 22. Also, the input/output processor 31 receives, via the network, the antenna 22 and the wireless communication module 18, data transmitted from other game apparatuses or data downloaded from a download server, and stores the received data in the flash memory 17. The CPU 10 is able to read and use the data stored in the flash memory 17. In addition to the data transmitted and received between the game apparatus body 5 and other game apparatuses or various servers, the flash memory 17 may store saved data of a game that is played using the game apparatus body 5 (such as result data or progress data of the game).

Further, the input/output processor 31 receives, via the antenna 23 and the wireless controller module 19, operation data or the like transmitted from the controller 7, and stores (temporarily) the operation data or the like in a buffer area of the internal main memory 35 or of the external main memory 12.

In addition, the expansion connector 20 and the external memory card connector 21 are connected to the input/output processor 31. The expansion connector 20 is a connector for such interface as USB, SCSI or the like. The expansion connector 20, instead of the wireless communication module 18, is able to perform communication with the network by being connected to such a medium as an external storage medium, to such a peripheral device as another controller, or to a connector for wired communication. The external memory card connector 21 is a connector to be connected to an external storage medium such as a memory card. For example, the input/output processor 31 is able to access the external storage medium via the expansion connector 20 or the external memory card connector 21 to store or read data in or from the external storage medium.

On the game apparatus body 5 (e.g., on a front main surface thereof), a power button 24 of the game apparatus body 5, a reset button 25 for resetting game processing, an insertion slot for mounting the optical disc 4 in a detachable manner, an eject button 26 for ejecting the optical disc 4 from the insertion slot of the game apparatus body 5, and the like are provided.

[3. Outline of Game Processing]

[3.1 Configuration of Virtual Space Set During Game Processing]

In an illustrative embodiment, the CPU 10, the GPU 32, and the like cooperate to perform information processing (including image processing) in the game system 1. Hereinafter, the CPU 10, the GPU 32, and the like which perform these information processing are collectively referred to as an "information processing section".

In the illustrative embodiment, a player who uses the game system 1 can operate an input device (e.g., the controller 7) of the game system 1 with a progress of the game processing to move a virtual object (e.g., a player character P1) in a virtual space. At that time, the game system 1 performs transformation of information based on a world coordinate system in which a model of the player character P1 is located, into a coordinate system based on a specific viewpoint in the virtual space (a perspective transformation process), and sequentially displays an event progressing in the virtual space, to the user through a display area (e.g., the monitor 2) of the game system 1.

In this case, during the image processing performed with the progress of the game, a viewpoint for capturing the virtual space (a viewpoint used in the perspective transformation process, and hereinafter, referred to as a virtual camera) is not a viewpoint based on a position (the world coordinate system) of a virtual object (e.g., the player character P1) in the virtual space (hereinafter, referred to as a "first person viewpoint"), but a viewpoint other than the first person viewpoint (hereinafter, referred to as a "third person viewpoint") is used.

The game system 1 generates an image in which a plurality of player characters (e.g., player characters P1 to P4) are displayed on the monitor 2, so as to adjust the position of the virtual camera such that the positions of the player characters can visually be recognized in the image displayed on the monitor 2, and displays the image.

However, when a virtual object other than the player characters (hereinafter, generically referred to as non-player character) is present in the virtual space in addition to the plurality of virtual objects, specifically, the player characters, the non-player character may be located between the virtual camera and any of the player characters. It is noted that the non-player character can serve, for example, as an object (an enemy object) representing an enemy for the player characters in the progress of the game processing.

Under this condition, the non-player character may obstruct a range of vision from the virtual camera to the player character, depending on the size and shape thereof.

In such a case as well, the game system 1 according to the illustrative embodiment can generate an image from which it can be recognized in which position the player character is located behind the non-player character and what shape of a portion of the non-player character faces the player character.

This will be described with reference to the appended drawings below.

Figure 3:
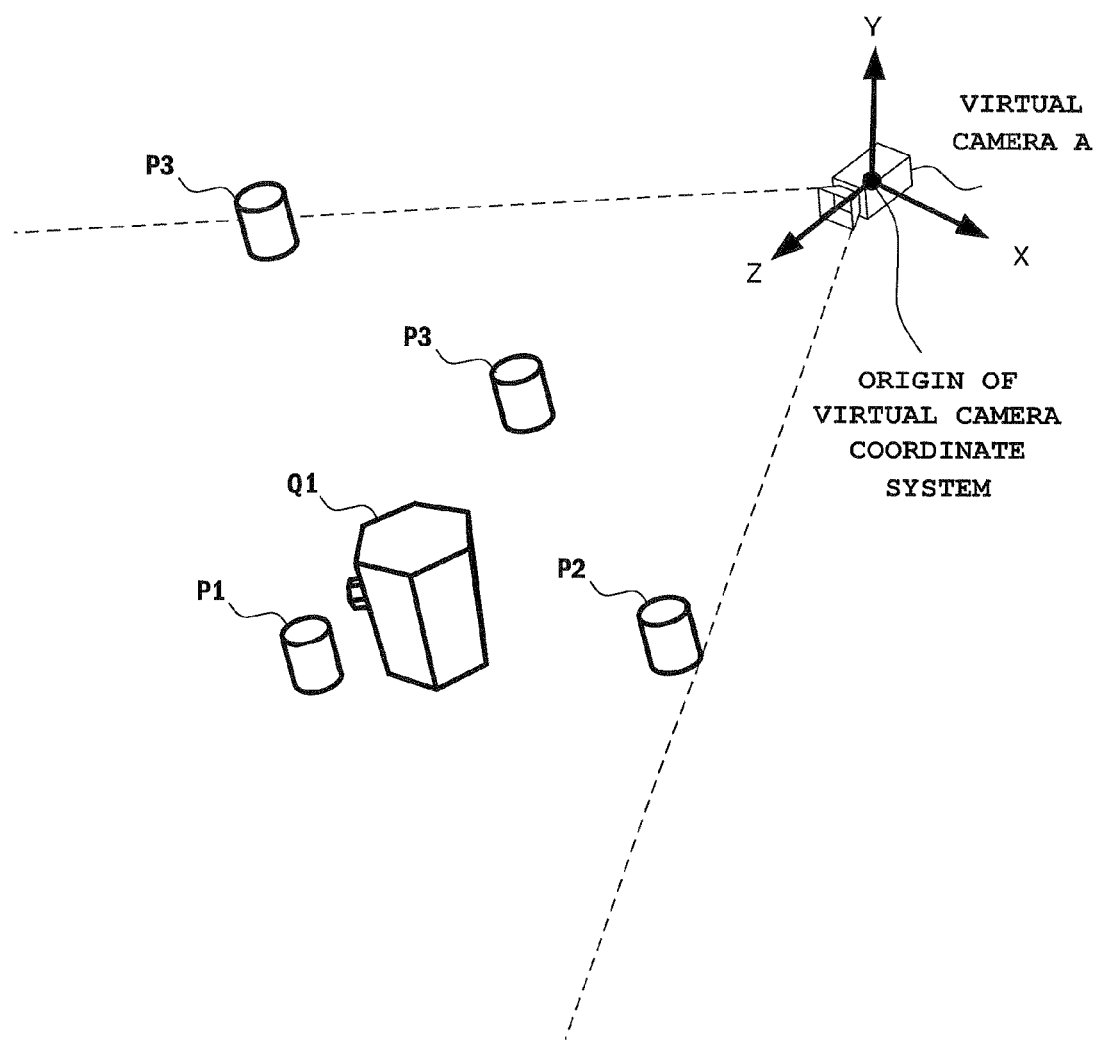
FIG. 3 is a diagram schematically showing a non-limiting example of an arrangement of a plurality of objects located in a virtual space and a virtual camera which is set for generating these objects.

FIG. 3 is a diagram schematically showing an arrangement of a plurality of objects located in the virtual space and a conceptual camera (the virtual camera) which is set for generating an image including these objects.

Specifically, a plurality of player characters P1 to P4 and a non-player character Q1 are located in a predetermined plane (hereinafter, referred to as a field) within the virtual space. A virtual camera A is set at such a position that the field is seen down obliquely therefrom. For the virtual camera A, various parameters for performing the perspective transformation process (e.g., a parameter representing the angle of view of a lens, and the like) are set by the game system 1.

It is noted that for simplification of explanation, the above field is a plane, but the shape is not intended to be limited to the illustrated one and may be any curved surface as long as a plurality of objects can be located therein. In addition, the type and number of the located virtual objects are as described above, but are not intended to be limited to the settings and may be other settings. Further, in FIG. 3, each virtual object is shown in a simplified shape (a circular cylinder or the like), but its shape is not intended to be limited to the illustrated one and may be a more complicated shape (e.g., a human-shaped virtual object).

Each of a plurality of players (four in this embodiment) who use the game system 1 is assigned one of operable player characters (the player characters P1 to P4 in this embodiment). Each player can operate the controller 7 held by the player, to control movement of the assigned player character in the field.

The game system 1 generates an image (display image) which represents the virtual space including these virtual objects and is to be rendered on the monitor 2, in accordance with the settings of the virtual camera A. In FIG. 3, with the player characters P1 to P4 and the non-player character Q1, the virtual camera A is located in the world coordinate system. The game system 1 allows the player characters P1 to P4 to move within a predetermined range such that the player characters P1 to P4 are put within the display image. Specifically, the player characters P1 to P4 and the non-player character Q1 are located, for example, so as to be included in a "viewing frustum" based on a virtual camera coordinate system which is set for the virtual camera A. The world coordinate system and the virtual camera coordinate system can be transformed to each other by appropriate coordinate transformation.

The viewing frustum is defined on the basis of a field of vision (FOV) and the distance between a near clip plane and a far clip plane designated by Z coordinates of the virtual camera coordinate system. It is noted that these clip planes and the like are omitted in FIG. 3.

[3.2. Description of Illustrative Image Processing]

The non-player character Q1 may be located on the near clip plane side of the player character P1 and at such a position as to hide a portion or the entirety of the player character P1 from the virtual camera A.

Conventionally, when the perspective transformation process is performed under this condition, for example, the player cannot recognize the player character P1 in an image displayed on the monitor 2 due to presence of the non-player character displayed on the near side of the player character P1. In addition, even when the player recognizes the position of the player character P1, the player cannot recognize, from the image, the shape of a portion of the player character P1 which is hidden by the non-player character Q1.

In the game system 1 according to the illustrative embodiment, the following processing is performed in order to solve this problem. The processing will be described with reference to FIG. 4A and the subsequent drawings.

Figure 4A:
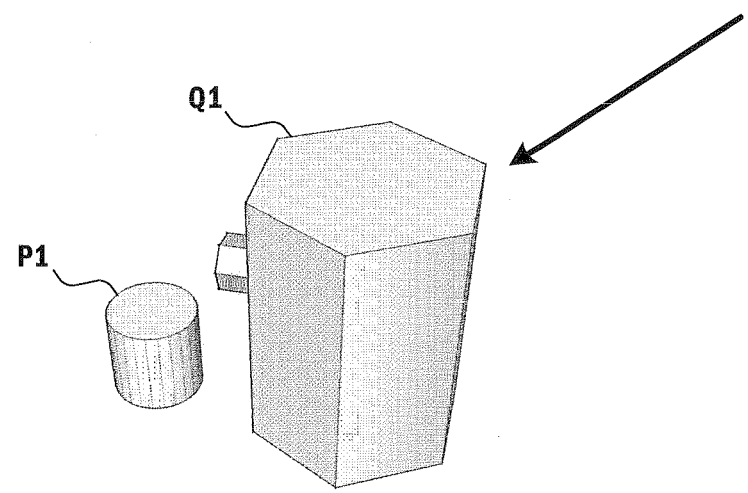
FIG. 4A is an enlarged schematic diagram of a non-limiting example of a region including a non-player character Q1 and a player character P1 in the arrangement illustrated in FIG. 3.

FIG. 4A is an enlarged schematic diagram of a region including the non-player character Q1 and the player character P1 in the arrangement illustrated in FIG. 3. In this example, a model representing the non-player character Q1 is a virtual object of a generally hexagonal column shape and has a projection on a side surface thereof. In this arrangement, the projection extends toward the player character P1. Although described later, the non-player character Q1 has another model as a model for representing it, and a set of these two models is handled as a model for representing the non-player character Q1 in the game system 1.

Figure 4B:
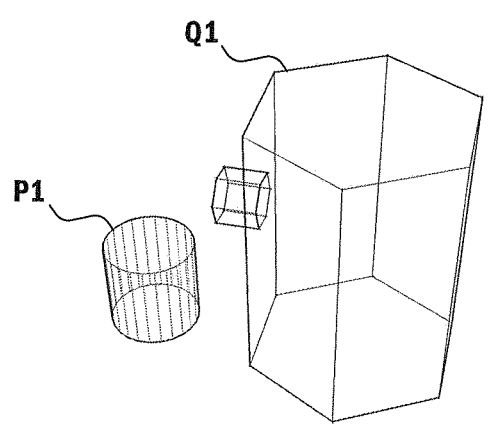
FIG. 4B is a schematic diagram showing a non-limiting example of wire frame models corresponding to the outer shapes of the virtual objects shown in FIG. 4A, which are shown to facilitate the understanding of the outer shapes of the virtual objects.

FIG. 4B is a schematic diagram of wire frame models which are shown to facilitate the understanding of the outer shapes of the virtual objects shown in FIG. 4A. FIG. 4B is a diagram conveniently shown to facilitate a description regarding the positional relationship between and shapes of the virtual objects shown in FIG. 4A, and is not an example of a display image.

In the game system 1, a third person viewpoint, specifically, such a viewpoint for perspective transformation that the field is seen down from the virtual camera A, is set. For the convenience sake, a case will be described where such a third person viewpoint that the two virtual objects are observed from the virtual camera A in the direction of an arrow shown in FIG. 4A is set.

Figure 4C:
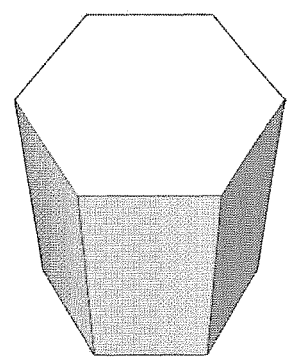
FIG. 4C is a diagram schematically showing a non-limiting example of a state where the non-player character Q1 is seen from a virtual camera A and the player character P1 is hidden behind the non-player character Q1 and cannot visually be recognized, when these two virtual objects are observed from the virtual camera A in the direction of an arrow shown in FIG. 4A.

When rendering is performed on the basis of the third person viewpoint, a display image is generated in which the player character P1 is hidden behind the non-player character Q1 as shown in FIG. 4C. FIG. 4C is a diagram schematically showing a state where the non-player character Q1 is seen from the virtual camera A and the player character P1 is hidden behind the non-player character Q1 and cannot visually be recognized, when these two virtual objects are observed from the virtual camera A in the direction of the arrow shown in FIG. 4A. It is noted that even when the non-player character Q1 is displayed so as to be translucent in this positional relationship, it is difficult to recognize the outer shape of the non-player character Q1 on the projection side.

Figure 4D:
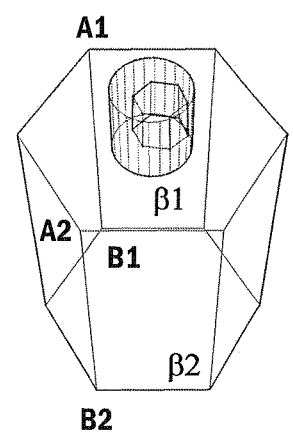
FIG. 4D is a schematic diagram showing a non-limiting example of wire frame models corresponding to the outer shapes of the virtual objects shown in FIG. 4C, which are shown to facilitate the understanding of the outer shapes of the virtual objects.

FIG. 4D is a schematic diagram of wire frame models corresponding to the virtual objects shown in FIG. 4C, which are shown to facilitate the understanding of the outer shapes of the virtual objects. FIG. 4D is a diagram conveniently shown to facilitate a description regarding the positional relationship between and the shapes of the virtual objects shown in FIG. 4C, and is not an example of a display image.

Figure 5:
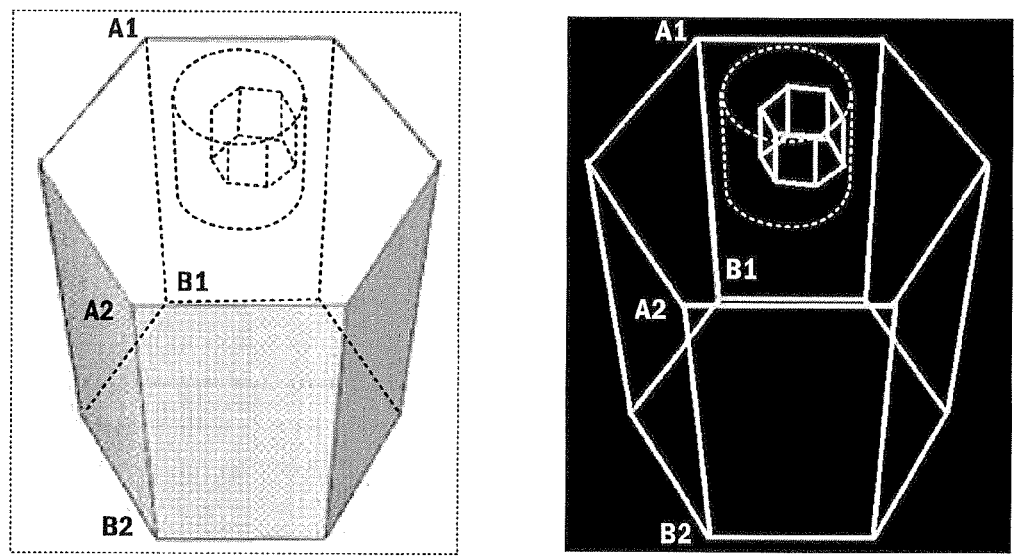
FIG. 5 a schematic diagram for illustrating a non-limiting example of image processing performed on the non-player character Q1.
Figure 5:
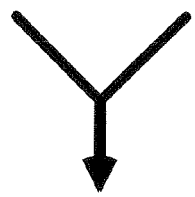
Figure 5:
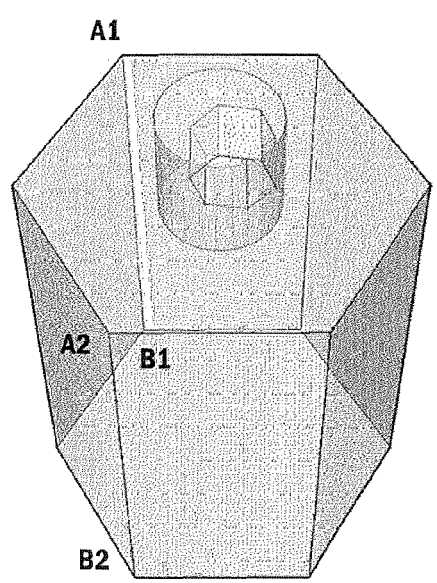

FIG. 5 is a schematic diagram for illustrating image processing performed on the non-player character Q1 when the two virtual objects are located in this positional relationship.

The image processing described here is image processing performed when a player character such as the player character P1 and the non-player character Q1 are located in such a positional relationship that the player character is hidden by the non-player character Q1 and cannot visually be recognized (hereinafter, referred to as a hiding relationship).

The model of the non-player character Q1 is defined as a set of a model which is normally rendered in opaque color and represents an object corresponding to a structure of a substantially hexagonal column shape (hereinafter, referred to as a sub-object 1 for the convenience sake) and a model which represents an object corresponding to an edge of the structure shown as the sub-object 1 or at least a portion of the edge (hereinafter, referred to as a sub-object 2 for the convenience sake).

A model which represents the non-player character Q1 and is normally recognized by the player during the game processing is a model of a structure having a projection on one side surface of a hexagonal column, namely, the sub-object 1, as schematically shown in FIG. 4A.

In the case where the hiding relationship is not established, the structure as the non-player character Q1 is rendered in opaque color and an image representing the appearance thereof is generated (the upper-left diagram of FIG. 5). Thus, in an image captured from the virtual camera A (a display image which is to be finally displayed on the monitor 2 and obtained as a result of the perspective transformation process), each surface of the structure is opaque, and a scene on the far clip plane side of the structure in the virtual space is hidden by the structure. It is noted that in the upper-left diagram of FIG. 5, the hidden player character and the line of the hidden surface of the non-player character are indicated by broken lines, but these broken lines are conveniently shown to facilitate understanding and are not actually displayed when rendering is performed in opaque color.

The relative positional relationship between the player character P1 and the non-player character Q1 depends on the progress of the game and an input operation performed by the player, and changes with time.

When the positional relationship between the player character P1 and the non-player character Q1 becomes the above hiding relationship (e.g., in the case illustrated in FIG. 3) during its changing, predetermined image processing is performed on the non-player character Q1.

The image processing makes it easy for the player to recognize the position of the player character P1 operated by the player and the shape of the non-player character Q1 that the player character P1 faces in the virtual space.

A specific determination as to whether or not the hiding relationship is established may be performed, for example, by determining whether or not a ray along a line of sight from the virtual camera A to the player character P1 intersects the non-player character Q1 (an intersection determination). On the basis of a result of such a determination, the game system 1 can determine that the hiding relationship is established, when the ray intersects the non-player character Q1. It is noted that although described later, the method of this hiding determination is not limited to this example.

When the hiding relationship is established, the sub-object 1 is rendered as a translucent virtual object. In other words, the game system 1 renders the sub-object 1 so as to take an alpha value which is previously set or dynamically set for the sub-object 1 (and corresponds to a translucent state), to generate an image corresponding to the model of the translucent sub-object 1. The translucent sub-object 1 allows a virtual object (e.g., the player character P1) or the like, located on the far clip plane of the sub-object 1, to be seen therethrough to be visually recognized by the player. It is noted that when rendering a model located on the far side (the far clip plane side) of the translucent model, a depth test is performed and this model is rendered prior to the translucent model present on the near side (the near clip plane side).

Further, when the hiding relationship is established, only a portion of the sub-object 2 of the non-player character Q1 which portion meets a predetermined condition is represented in an image which is to be finally displayed on the monitor 2.

The sub-object 2 is a virtual object which corresponds to the edge of the structure shown as the sub-object 1 or at least a portion of the edge (the upper-right diagram of FIG. 5). It is noted that in the upper-right diagram of FIG. 5, the position of the player character is shown by a broken line to facilitate understanding. Specifically, for example, the sub-object 2 can be defined as a model obtained by mapping a texture, which is transparent except for a portion at and near the edge (the boundary between surfaces), to a polygon model which is substantially the same in shape as the sub-object 1. In the upper-right diagram of FIG. 5, the sub-object 2 obtained thus is schematically shown (the background is conveniently darkened in view of ease of understanding the features thereof).

The above predetermined condition which is to be met is, for example, the following condition. The condition is defined on the basis of the relationship between: a line-of-sight vector $e_k$ which is directed from the origin of the virtual camera coordinate system (an orthogonal coordinate system composed of three axes, an X axis, a Y axis, and a Z axis; see FIG. 1) set for the virtual camera A (a viewpoint) to a polygon k constituting the sub-object 2; and a normal vector $n_k$ which is defined for each polygon constituting the sub-object 2 (k=1, 2, 3, . . . ; k is an illustrative number for identifying each polygon constituting a model). This relationship will be described with reference to FIG. 6A and the like.

Figure 6A:
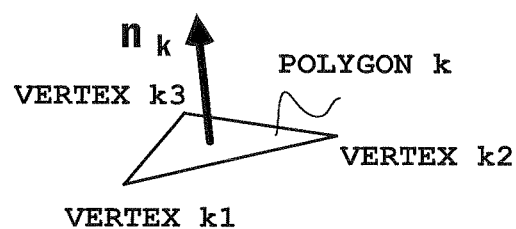
FIG. 6A is a schematic diagram showing a non-limiting example of a normal vector $n_k$ which is define for a polygon k constituting a sub-object 2 of the non-player character Q1.

FIG. 6A is a schematic diagram showing a normal vector $n_k$ defined for a polygon k constituting the model of the non-player character Q1. A normal vector $n_k$ which is perpendicular to a surface defined by vertices which define this polygon is defined. Here, as an example of a primitive figure used in the game system 1, a polygon (a triangular polygon) is shown. However, the usable primitive figure is not limited to the example of this polygon. Typically, a surface which is defined with a designation order of the vertices constituting the polygon which designation order is a counterclockwise order is set as a front surface, and the normal vector $e_k$ is designated as a vector orthogonal to the surface, but is not limited to this example.

Figure 6B:
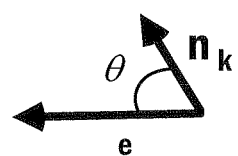
FIG. 6B is a diagram schematically showing a non-limiting example of an angle θ formed between a vector $e_k$ and an arbitrary normal vector $n_k$.

FIG. 6B is a diagram schematically showing the angle θ formed between the vector $e_k$ and an arbitrary normal vector $n_k$. The angle θ is defined by the inner product $(e_k, n_k)$ of the vectors $e_k$ and $n_k$ as follows.

$$(e_k, n_k) = |e_k||n_k| \cos \theta$$

The information processing section of the game system 1 can determine whether or not to set the polygon constituting the sub-object 2 as a target to be displayed on the monitor 2, in accordance with the value of the inner product. Here, when both vectors are normalized, the value of the above inner product is a value of −0.1 to 1.0. Thus, it is possible to set front and back of the polygon by evaluating the value of the inner product (or the sign thereof).

Here, a case will be described where the sub-object 2 is a model obtained by mapping a texture, which is transparent except for a portion at and near the edge, to a polygon model which is substantially the same in shape as the sub-object 1.

In this case, the direction of the normal vector defined for each polygon constituting the sub-object 1 and the direction of the normal vector defined for a polygon which constitutes the sub-object 2 and is located in corresponding relation to this polygon constituting the sub-object 1 are the same.

The sub-object 2 is rendered such that a portion thereof is displayed which corresponds to a surface which can be evaluated as a hidden surface in the sub-object 1. When the player character P1 is located on the far side of the non-player character Q1 so as to be hidden from the virtual camera A, rendering is performed such that a surface is displayed which includes the surface of the sub-object 2 that the player character P1 faces. In other words, the game system 1 can set the sign of an inner product value which a polygon to be displayed has to have, for each polygon of the model of the sub-object 2 such that the sign is opposite to that for the sub-object 1. And the game system 1 can render the sub-object 2 based on the setting. Then, the sub-object 1 and the sub-object 2 are rendered so as to substantially overlap each other, in view of the depth test. Thus, it is possible for the player to recognize the position of the player character P1 hidden behind the non-player character Q1 as well as the shape of the non-player character Q1 on the back side (the shape on the player character P1 side).

A method for distinguishing a displayed portion of the non-player character Q1 from a portion of the non-player character Q1 which is not displayed, will be described in more detail.

FIG. 4D is a diagram schematically showing a wire frame obtained by extracting the edge portion of the sub-object 1 (see FIG. 4C) of the non-player character Q1, and the player character P1 located on the far side of the wire frame. An edge A1-B1 on one side surface on the far clip plane side (referred to as a side surface β1) in the non-player character Q1 is focused on. In addition, of edges parallel to the edge A1-B1, an edge on a side surface (referred to as a side surface β2) which faces the surface including the edge A1-B1 is referred to as an edge A2-B2.

In this positional relationship, the angle formed between a normal vector which is set for a polygon on the side surface β1 and a normal vector which is set for a polygon on the side surface β2 is π. Thus, when a normal vector $n_k$, which is defined for a polygon k on the side surface β1, and a vector $e_k$ are directed in the same direction, the value of the inner product thereof is positive. At that time, the value of the inner product of a normal vector $n_m$, which is defined for a polygon $n_m$ on the side surface β2, and a vector $e_m$ is negative. When it is defined that of the polygons of the sub-object 2, only polygons having a positive inner product value are displayed, a polygon corresponding to the edge A1-B1 is displayed and a polygon corresponding to the edge A2-B2 is not displayed.

Therefore, in the example of FIG. 5, in the sub-object 2 shown in the upper-right diagram, the portion corresponding to the edge A1-B1 is displayed, and the portion corresponding to the edge A2-B2 is not displayed. Since the model representing the non-player character Q1 is defined as a set of the sub-object 1 and the sub-object 2, the display form of the final model is as shown in the lower diagram of FIG. 5. It is noted that for simplification of explanation, a portion of the sub-object 2 other than the above two edges is omitted in the lower diagram of FIG. 5.

As described above, when the positional relationship with the non-player character Q1 which changes with the progress of the game meets a predetermined condition (e.g., when the hiding relationship is established), the game system 1 performs a transparent process on the sub-object 1 of the non-player character Q1. The game system 1 also sets only polygons of the sub-object 2 which represent the shape of a portion which is hidden when seen from a viewpoint that is the third person viewpoint, as a target to be displayed (e.g., by performing a determination on the basis of the inner product value of a line-of-sight vector and a normal vector of a polygon).

Then, the game system 1 generates an image in which the model of the sub-object 1 on which the transparent process has been performed and the portion of the sub-object 2 corresponding to the shape of the model which portion is determined as a displayed target are displayed so as to be superimposed on each other.

Figure 6C:
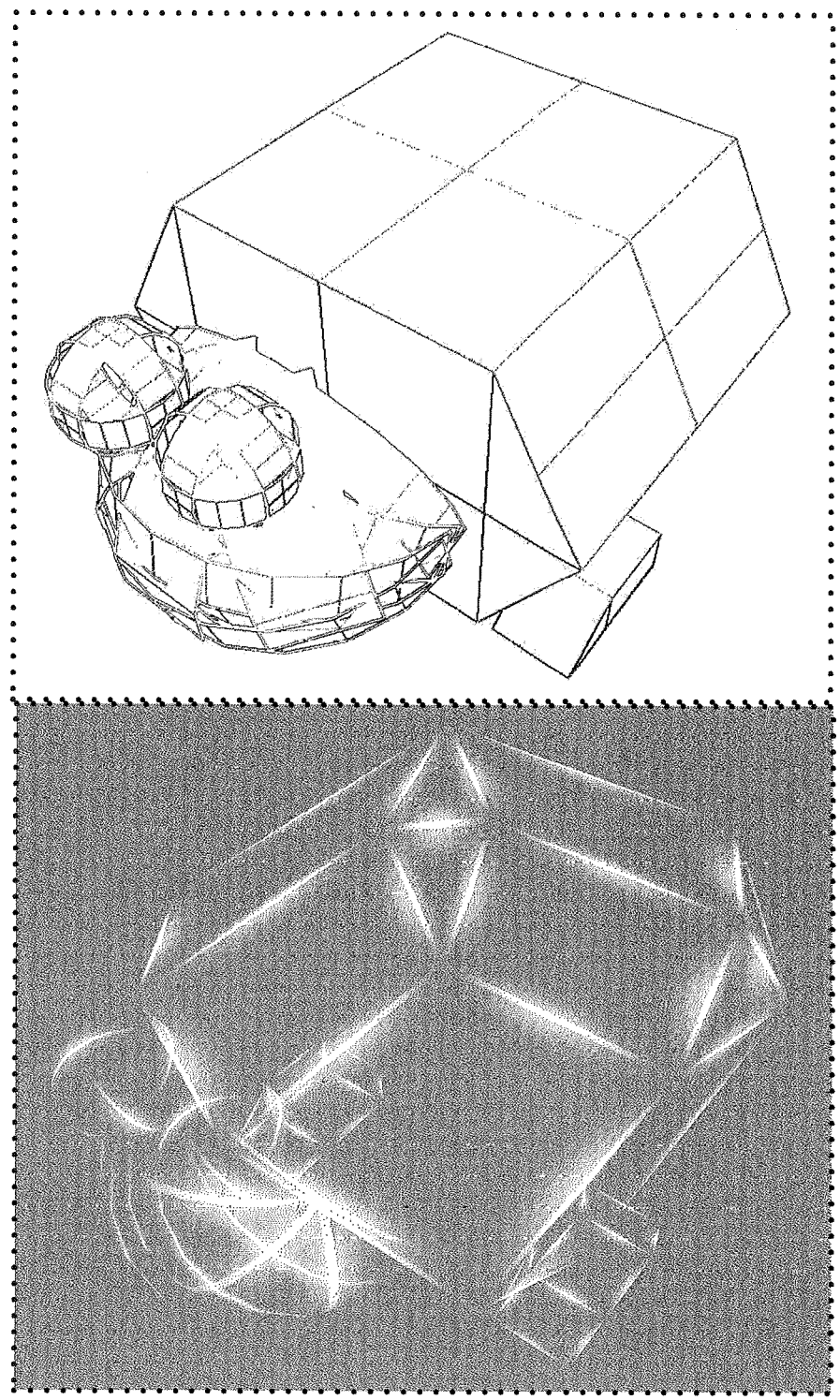
FIG. 6C is a diagram showing another non-limiting example of the sub-object 2.

Another example of the sub-object 2 is shown in FIG. 6C. Specifically, a non-player character having an outer shape corresponding to the shape of the sub-object 1 is shown in the upper diagram of FIG. 6C, and a sub-object (corresponding to the sub-object 2; hereinafter, referred to as a sub-object 2') set for the non player character in the upper diagram of FIG. 6C is shown in the lower diagram of FIG. 6C.

The sub-object 2' is a sub-object which is generated for a virtual object (the upper diagram) having a projection shape in the outside thereof when observed from the third person viewpoint and which corresponds to an edge on the back surface which is not seen from the viewpoint.

The processing performed on the non-player character Q1 in the above image processing when visual recognition of the player character is obstructed by the non-player character Q1 has been described. Hereinafter, a method for performing predetermined processing on the player character in order to solve a similar problem, will be described.

This processing may be performed together with the above processing performed on the non-player character or may be performed independently of the above processing.

Hereinafter, as shown in FIG. 3, as an example, a case will be described where the player character P1 is located on the far clip plane side of the non-player character Q1 and visual recognition of the player character P1 is obstructed when seen from the virtual camera A.

The game system 1 performs the following processing when determining that a positional relationship is established in which the player character P1 is located behind the non-player character Q1.

As described above, each of the player character and the non-player character which are located in the virtual space is assigned a model having a predetermined attribute. For each model, a space for excluding the other model may be defined in order for the models to move in such a positional relationship as to prevent the models from entering each other.

In the illustrative embodiment, when the player character P1 is located on the far clip plane side of the non-player character Q1 and it is determined that the player character P1 is hidden when seen from the virtual camera A, the game system 1 controls the above space for excluding the model as described below, to provide a situation where the player more easily recognizes the player character P1 during the game processing.

This will be described with reference to FIGS. 7A and 7B.

Figure 7A:
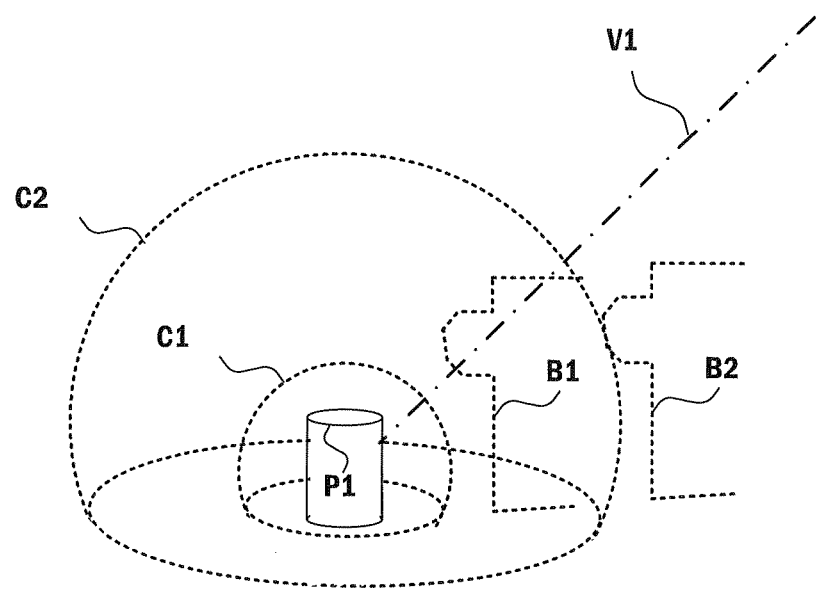
FIG. 7A is a diagram schematically showing a non-limiting example of a process of determining presence/absence of a hiding relationship which process is performed between the player character P1 and the non-player character Q1.

FIG. 7A is a diagram schematically showing a process of determining presence/absence of the hiding relationship which process is performed between the player character P1 and the non-player character Q1.

The information processing section of the game system 1 determines whether or not the positional relationship between the player character P1 and the non-player character Q1 is the hiding relationship. This determination can be performed by emitting a ray from the virtual camera A to the player character P1 and determining whether or not the ray intersects the non-player character Q1 (the intersection determination).

In FIG. 7A, a hemisphere C1 is a hemisphere which is set for the player character P1 to define a region thereof when a determination of collision (between objects) is performed. The hemisphere C1 is defined for preventing another object from entering the player character P1. The region defined by the hemisphere C1 may have any other shape.

Meanwhile, a dotted line B1 schematically indicates the position of and a portion of the outer shape of the non-player character Q1 at the above intersection determination. In this example, the projection of the non-player character Q1 faces toward the player character P1.

FIG. 7A illustrates a case where it is determined in the intersection determination that a ray V1 intersects the non-player character Q1 (located at the position of the dotted line B1). On the basis of the determination, the information processing section enlarges the above hemisphere C1 to the size of a hemisphere C2. Then, the information processing section performs a determination of collision with the non-player character Q1 on the basis of the hemisphere C2. At that time, since the non-player character Q1 has entered the inside the hemisphere C2 as shown by the outer shape line that is the dotted line B1, the game system 1 determines in the determination of collision that the positional relationship between the player character P1 and the non-player character Q1 is not permitted. As a result of the determination, for example, the game system 1 moves the non-player character Q1 to a position shown by a dotted line B2 or moves the player character P1 such that a relative positional relationship which is the same as that established as a result of the movement is established, whereby the game system 1 increases the distance between these two virtual objects.

It is noted that after that, when the relative positional relationship between the player character P1 and the non-player character Q1 changes with the progress of the game, the information processing section of the game system 1 dynamically controls the size of the hemisphere for the player character which is used for the determination of collision between the virtual objects, in accordance with a result of the intersection determination at that time. In other words, when it is determined, by the intersection determination based on the ray, that the hiding relationship is not established, the game system 1 resets the hemisphere C1 as a hemisphere used for the determination of collision.

Thus, a situation can be avoided where the player character P1 enters deeply into the space below the projection of the non-player character Q1 larger than the player character P1 such that the player character P1 is continuously hidden behind the non-player character Q1 and cannot visually be recognized during the game processing. In addition, by dynamically changing the setting of the hemisphere, a region where the virtual objects are moveable can be kept wider when the hiding relationship is not established.

It is noted that when the game system 1 performs a determination of collision between the player character P1 and another player character (e.g., P2), the game system 1 does not have to change the size of a hemisphere used for the determination of collision of the player character P1 (or another player character), in accordance with a result of the determination of intersection with the non-player character Q1. In addition, instead of controlling the hemisphere having a center at the player character P1, a region may be controlled which is defined in the virtual space on the basis of the position of the player character P1 and has a shape other than a hemisphere.

Figure 7B:
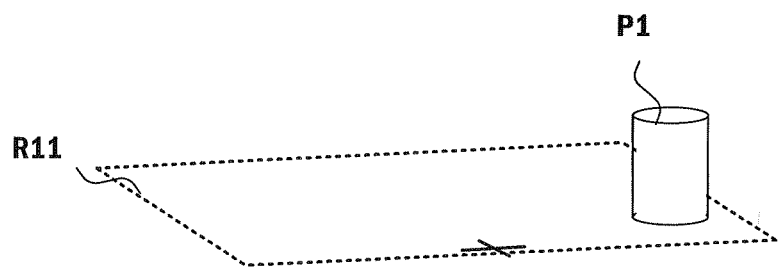
FIG. 7B is a schematic diagram showing an exemplary modification of FIG. 7A.

With reference to FIG. 7B, a case will be described where the intersection determination based on the ray is not used. Instead of this intersection determination, it may be determined whether or not into a region defined with reference to the position of the player character P1 or the non-player character Q1, an opponent for the object used as the reference has entered. FIG. 7B is a schematic diagram showing a modification of FIG. 7A. For example, a process is performed in which as shown in FIG. 7B, the hemisphere is enlarged (to the hemisphere C2) when the player character P1 enters into a region (a predetermined range extending from a cross mark shown in FIG. 7B toward the far side of the screen; a region R11 in FIG. 7B) defined on the basis of the position of the non-player character Q1 (the cross mark indicates the position of the non-player character Q1), and the hemisphere is returned to the original hemisphere (hemisphere C1) when the player character P1 moves out of the region.

[4. Details of Game Processing]

Figure 8:
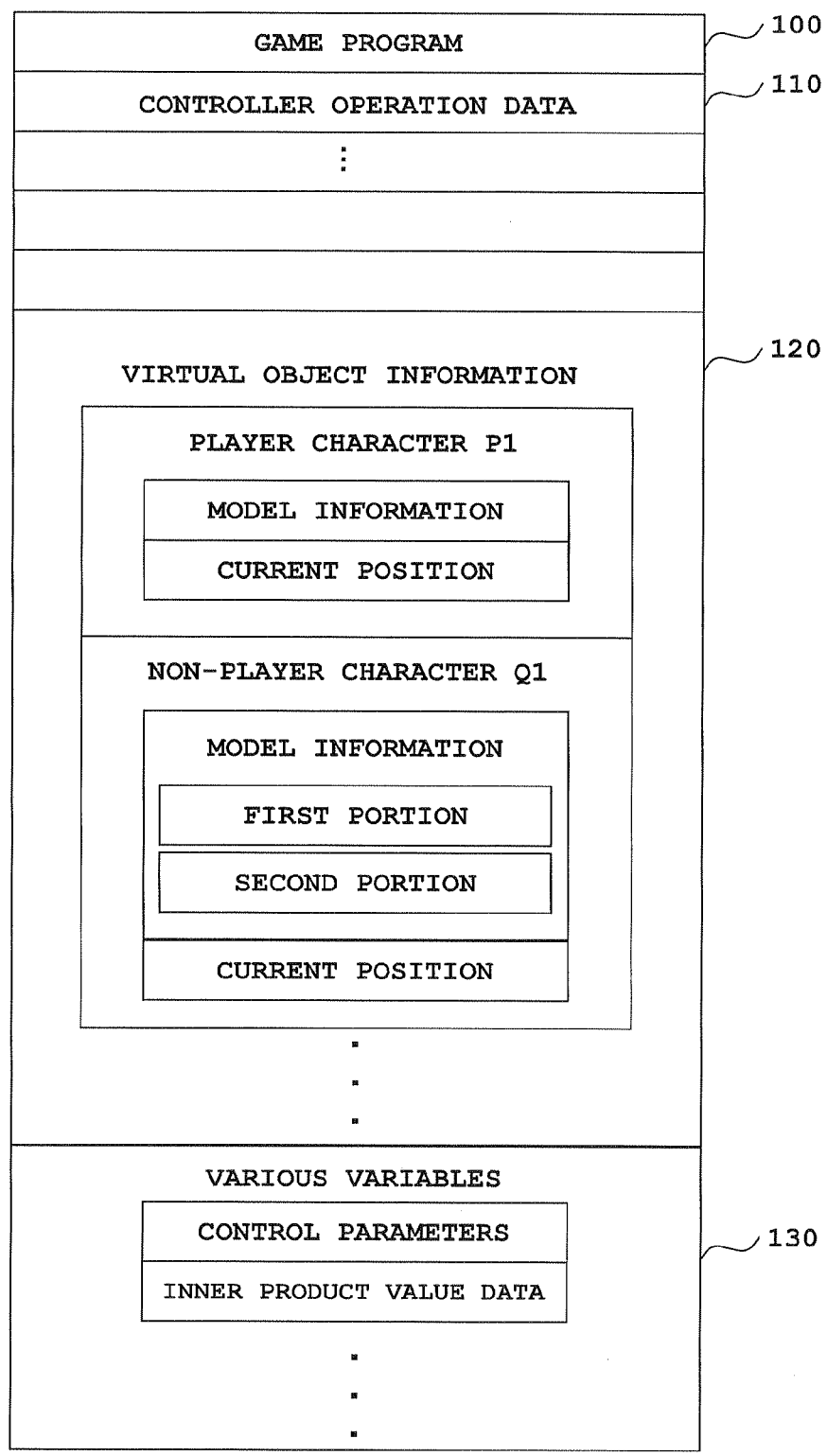
FIG. 8 is a data showing a non-limiting example of various data used in game processing.

Next, the game processing performed in the game system 1 will be described in detail. First, various data used in the game processing will be described. FIG. 8 is a diagram showing various data (including programs) used in the game processing. FIG. 8 is a diagram showing main data stored in the main memory (the external main memory 12 or the internal main memory 11e) of the game apparatus 3. As shown in FIG. 8, in the main memory of the game apparatus 3, a game program 100, controller operation data 110, and processing data 120 and 130 are stored. It is noted that in the main memory, in addition to the data shown in FIG. 8, data used in the game, such as image data of various objects appearing in the game and audio data used in the game, are stored.

A part or the entirety of the game program 100 is read from the optical disc 4 and stored in the main memory, at an appropriate timing after the game apparatus 3 is powered on. It is noted that the game program 100 may be obtained from the flash memory 17 or an external device of the game apparatus 3 (e.g., via the Internet), instead of the optical disc 4. In addition, a part of the game program 100 (e.g., a program for calculating the orientation of the controller 7) may previously be stored in the game apparatus 3.

The controller operation data 110 represents operations of the user on the controller 7 and is outputted (transmitted) from the controller 7 on the basis of the operations on the controller 7. The controller operation data 110 is transmitted from the controller 7, obtained by the game apparatus 3, and stored in the main memory. The controller operation data 110 includes angular velocity data, main operation button data, and acceleration data. It is noted that the controller operation data 110 includes, in addition to these data, marker coordinate data representing a coordinate calculated by the image processing circuit 41 of the controller 7. In addition, in order to obtain operation data from a plurality of controllers 7, the game apparatus 3 stores the controller operation data 110 transmitted from each controller 7, in the main memory. A predetermined number of items of the controller operation data 110 from the latest (finally obtained) data may be stored in a chronological order for each controller 7.

The processing data 120 is used in the game processing (main processing) described later. The processing data 120 also includes data of virtual objects used in the game processing. Each virtual object has, in addition to data which defines an attribute of the virtual object and includes the shape of a model, position information which is defined in the virtual space during the game processing.

The processing data 130 includes various data used in the game processing, such as data representing various parameters which are set for various objects appearing in the game.

Figure 9A:
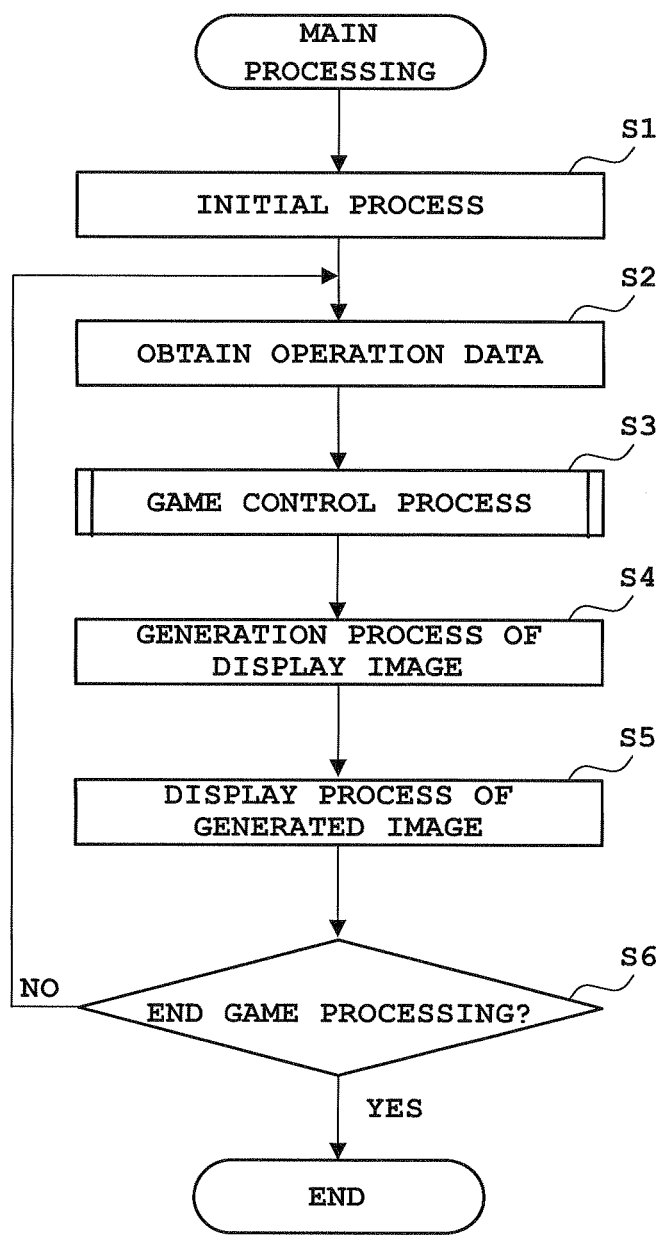
FIG. 9A is a main flowchart showing a non-limiting example of the flow of game processing performed in a game apparatus 3.

Next, the game processing performed in the game apparatus 3 will be described in detail with reference to FIGS. 9A and 9B. FIG. 9A is a main flowchart showing the flow of the game processing performed in the game apparatus 3. When the game apparatus 3 is powered on, the CPU 10 of the game apparatus 3 executes a boot program stored in a boot ROM which is not shown, thereby initializing the respective units such as the main memory. Then, the game program 100 stored in the optical disc 4 is loaded into the main memory, and execution of the game program 100 is started by the CPU 10. The flowchart shown in FIG. 9A is a flowchart showing processes performed after the above processes. It is noted that the game apparatus 3 may be configured to execute the game program 100 immediately after powered on, or to initially execute a built-in program for displaying a predetermined menu screen after powered on, and then execute the game program 100, for example, in accordance with an instruction to start the game which is made by the user performing a selection operation on the menu screen.

Figure 9B:
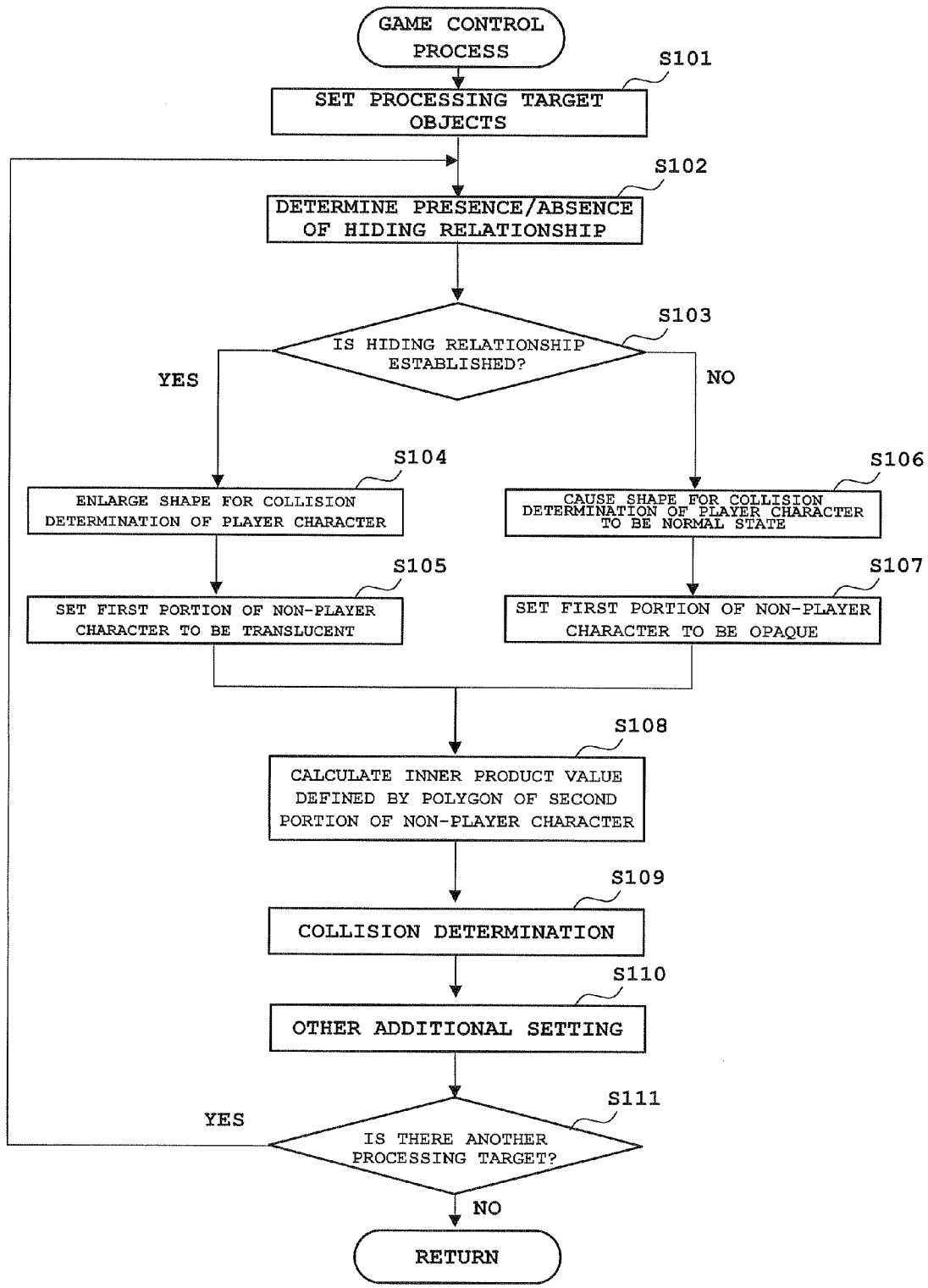
FIG. 9B is a flowchart showing a non-limiting example of a defined process (game control process) corresponding to step 3 in the flowchart shown in FIG. 9A.

It is noted that a process at each step in the flowcharts shown in FIGS. 9A and 9B is merely an example, and the order of the process at each step may be changed as long as the same result is obtained. In addition, the values of variables are also merely examples, and other values may be used according to need. Further, in the illustrative embodiment, the "information processing section" (an integral of the CPU 10, the GPU 32, and the like) in the game system 1 performs the process at each step in the flowcharts. However, only a part of the information processing section may perform processes at some of the steps in the flowcharts, or a processor or a dedicated circuit other than the CPU 10 and the GPU 32 may perform processes at some of the steps in the flowcharts.

First, at step 1 (S1 in FIG. 9A; the same correspondence applies to the following steps), the information processing section of the game system 1 performs an initial process. The initial process is a process of constructing a virtual game space, locating each object (e.g., the player characters P1 to P4, the non-player character Q1, and the like) appearing in the game space, locating a virtual camera (e.g., the virtual camera A) at an initial position, and setting initial values of various parameters used in the game processing.

The positions and the orientations of the player characters P1 to P4 and the non-player character Q1 as illustrative virtual objects in the illustrative embodiment are set. Then, the virtual camera A is set in accordance with these settings.

In addition, at step 1, an initial process for each controller 7 is performed. For example, an image for prompting one or a plurality of players to hold the controllers 7 is displayed on the display screen. As a result of the initial process for each controller 7, set variables including parameters which can be outputted by each controller 7 are set to initial values. When the initial process for each controller 7 is completed, the information processing section performs a process at step 2.

Thereafter, a process loop of processes at steps 2 to 6 is repeatedly performed every predetermined time (a one-frame time, e.g., 1/60 sec).

At step 2, the information processing section obtains operation data transmitted from a plurality of controllers 7. Each controller 7 repeatedly transmits operation data (controller operation data) to the game apparatus 3. In the game apparatus 3, the wireless communication module 18 sequentially receives terminal operation data, and the input-output processor 31 sequentially stores the received terminal operation data in the main memory. In addition, the wireless controller module 19 sequentially receives each controller operation data, and the input-output processor 31 sequentially stores the received controller operation data in the main memory. The interval of transmission and reception between the controllers 7 and the game apparatus 3 is preferably shorter than the processing time of the game, and is, for example, 1/200 sec. At step 2, the information processing section reads out the latest controller operation data 110 from the main memory. Subsequent to step 2, a process at step 3 is performed.

At step 3, the information processing section performs a game control process. The game control process is a process of progressing the game in accordance with a game operation performed by the player.

Specifically, in the game control process in the illustrative embodiment, mainly, in accordance with operations on the plurality of controllers 7, the virtual object corresponding to each controller 7 follows the progress of the game and its internal state (e.g., display form) is sequentially set. Subsequent processes are performed according to these settings. Hereinafter, the game control process will be described in detail with reference to FIG. 9B.

FIG. 9B is a flowchart showing a defined process (the game control process; steps 101 to 111) corresponding to step 3 in the flowchart shown in FIG. 9A.

At step 101, the information processing section performs a process of setting virtual objects which are to be targets of the game control process. In addition, the information processing section specifies a type of a process to be performed on the virtual objects.

Specifically, the information processing section sets virtual objects which are to be targeted for the processes subsequent to step 101, on the basis of the operation information obtained at step 2 as well as the number and type of player characters operated by the players who use the game system 1, the number and type of non-player characters, and presence/absence and content of interaction among these objects which has to be considered in the progress of the game.

In the example shown in FIG. 3, under the condition of the third person viewpoint based on the virtual camera A, the information processing section performs the process at step 101 on the basis of the setting in which the player characters P1 to P4, which are operable by a plurality of players, and the non-player character Q1 are located in the virtual space. In this non-limiting example, since four player characters and one non-player characters are present, it is set to perform a determination at the next step 102 between each of the four player characters and the non-player character. Then, the information processing section proceeds to a process at step 102.

At step 102, the information processing section performs a process of determining whether or not the "hiding relationship" is established between each player character and the non-player character. In the process, calculation for determining whether or not the "hiding relationship" is established is performed on the basis of position information, in the virtual space, of the virtual objects which are set at step 101 as the processing targets at step 2. When a plurality of virtual objects are present, the information processing section performs this calculation for all the objects between which the hiding relationship can be established.

Specifically, the information processing section performs the determination as to whether or not the hiding relationship is established, as follows. For example, the information processing section performs the calculation for determining presence/absence of the hiding relationship, by determining whether or not a ray along a line of sight from the virtual camera A to the player character P1 intersects the non-player character Q1 (the intersection determination). As a result of such a determination, when it is determined that the ray intersects the non-player character Q1, the game system 1 can determine that the hiding relationship is established between the player character P1 and the non-player character Q1. Then, the information processing section proceeds to a process at step 103.

At step 103, the information processing section performs a process of selecting a subsequent process on the basis of a result of the calculation performed at step 102. When the hiding relationship is established between the virtual objects which are the processing targets, the information processing section proceeds to a process at step 104. On the other hand, when the hiding relationship is not established, the information processing section proceeds to a process at step 106.

At step 104, the information processing section performs a process of setting a shape for collision determination of the player character, to an enlarged state.

Specifically, when it is determined at step 103 that the hiding relationship is established between the player character P1 and the non-player character Q1, the information processing section sets the hemisphere for collision determination which is set for the player character P1, from the hemisphere C1 in a normal state to an enlarged state of the hemisphere C2 having a larger radius than that of this hemisphere (see FIG. 7A). Then, the information processing section proceeds to a process at step 105. It is noted that for natural switching, the enlargement from the hemisphere C1 to the hemisphere C2 may be performed gradually for a predetermined time.

At step 105, the information processing section performs setting of the sub-object 1 of the non-player character Q1 to be translucent.

Specifically, as described in the outline of the game processing, the non-player character Q1 is defined as a set of an object (the sub-object 1) corresponding to a structure rendered normally in opaque color and an object (the sub-object 2) corresponding to the edge of the structure shown as the sub-object 1 or at least a portion of the edge. When it is determined at step 103 that the hiding relationship is established between the player character P1 and the non-player character Q1, the information processing section performs, at step 105, setting of the sub-object 1 of the non-player character Q1 to be translucent.

Specifically, the information processing section sets an alpha value which is set for each polygon defined as the sub-object 1, to a value which provides translucence. As an example, a case will be described where the alpha value is a value of 0.0 to 1.0, transparence is provided when the alpha value is 0.0, and opacity is provided when the alpha value is 1.0. A state of being "translucent" can be defined as a state obtained when the alpha value is 0.5. In addition, the alpha value may not be provided as a fixed value, and may be set so as to gradually approach a predetermined value with the progress of the game processing. Such setting of the alpha value is illustrative and not limited to this example. Then, the information processing section proceeds to a process at step 108.

As described above, when it is determined in the process at step 103 that the hiding relationship is not established, the information processing section proceeds to a process at step 106.

At step 106, the information processing section performs a process of setting the hemisphere for collision determination which is set for the player character P1, to its normal state (the hemisphere C1) or performs a process of maintaining its setting. Then, the information processing section proceeds to a process at step 107. It is noted that for natural switching, the change to the hemisphere C1 may be performed gradually for a predetermined time.

At step 107, the information processing section performs setting of the sub-object 1 of the non-player character to be opaque. Then, the information processing section proceeds to the process at step 108.

At step 108, the information processing section performs a process of calculating an inner product value which is defined on the basis of each polygon of the sub-object 2 of the non-player character.

Specifically, the inner product value is defined on the basis of the relationship between: a three-dimensional vector $e_k$ which is directed from the origin of the virtual camera coordinate system (the orthogonal coordinate system composed of three axes, an X axis, a Y axis, and a Z axis; see FIG. 1) set for the virtual camera A (the viewpoint) to a polygon k (constituting a model); and a normal vector $n_k$ which is defined for the polygon k ([k=1, 2, 3, . . . ]; the index k is an illustrative number for identifying each polygon constituting the model).

Here, as described above, the sub-object 2 is a virtual object corresponding to the edge of the structure shown as the sub-object 1 or at least a portion of the edge. The information processing section calculates an inner product value of the three-dimensional vector $e_k$ and the normal vector $n_k$ for each polygon k constituting the object. Then, the information processing section stores the result of the calculation in the storage area of the game system 1. Then, the information processing section proceeds to a process at step 109. The inner product value is used when an image to be displayed (on the monitor 2) is generated at subsequent step 4.

At step 109, the information processing section performs a determination of collision between the non-player character Q1 and the player character P1. Then, the information processing section proceeds to a process at step 110. The information processing section determines whether or not a space which is defined by the hemisphere C1 or C2 and occupied by the player character P1 overlaps a space which is previously set and occupied by the non-player character Q1. For this determination, a general collision determination method can be used. Then, the information processing section stores a result of the collision determination in the storage area of the game system 1 and proceeds to a process at step 110.

At step 110, when additional setting has to be performed for image processing of the virtual objects, the information processing section performs the additional setting. For example, in accordance with a result of the determination at step 109, the information processing section can appropriately move the positions, in the virtual space, of the virtual objects which are the determination targets, to reset their positions. Then, the information processing section proceeds to a process at step 111.

At step 111, the information processing section performs a process of determining presence/absence of the hiding relationship, and determining, in accordance with the determination, whether or not there is another virtual object for which settings for image processing have to be changed. As a result of the determination, when there is such another virtual object (YES at step 111), the information processing section proceeds to the process at step 102. When there is not such another virtual object (NO at step 111), the information processing section ends the game control process and returns to a process at step 4 (FIG. 9A).

Referring back to FIG. 9A, processes at subsequent steps will be described.

At step 4, the information processing section performs a process of generating an image which is to be displayed on the monitor 2, on the basis of the results of the determinations and setting performed in the process at step 3 (steps 101 to 111 in FIG. 9B).

Specifically, the information processing section renders a display image on the basis of the positions of the virtual objects present in the virtual space and the setting performed at step 3 for the virtual objects. In the non-limiting example shown in FIG. 3 and the like, the information processing section performs a perspective transformation process on the basis of the virtual camera coordinate system having an origin at the position of the virtual camera A, to generate an image including the player characters P1 to P4 and the non-player character Q1. It is noted that in the rendering, the information processing section performs a depth test in which depth information (e.g., Z value) is compared per pixel.

Here, with regard to the player character P1 located on the far clip plane side of the non-player character Q1, its sub-object 1 is rendered so as to be translucent. Thus, even when the hiding relationship is established between these objects, the player who views the display image can recognize the position of the player character P1.

Further, the information processing section displays a portion of the sub-object 2 of the non-player character which portion meets a predetermined condition, together with the sub-object 1 of the non-player character in a superimposed manner. The predetermined condition is a condition which is defined on the basis of the inner product value of: a normal vector which is set for the polygon of the portion among each polygon constituting the sub-object 2; and a line-of-sight vector from the virtual camera A.

Specifically, the sub-object 2 is rendered such that a portion thereof corresponding to a surface which is evaluated as a hidden surface in the sub-object 1 is displayed. When the player character P1 is located on the far side of the non-player character Q1 so as to be hidden from the virtual camera A, rendering is performed such that a surface including the surface of the sub-object 2 that the player character P1 faces is displayed. In other words, the game system 1 sets the sign of an inner product value which a polygon to be displayed has to have, for each polygon of the sub-object 2 such that the sign is opposite to that for the sub-object 1, and renders the sub-object 2.

At step 5, the information processing section displays the image generated at step 4, on a display section (e.g., the monitor 2) of the game system 1. Then, the information processing section proceeds to a process at step 6.

At step 6, the information processing section determines whether or not to end the game processing being performed in the game system 1. When it is determined to continue the game processing (NO at step 6), the information processing section returns to the process at step 2. On the other hand, when it is determined to end the game processing (YES at step 6), the information processing section completes the main processing.

OTHERS

In the illustrative embodiment described above, the game processing is executed by the game system 1. However, in another illustrative embodiment, a plurality of information processing apparatuses, included in a computer system, which can communicate with each other may share the execution of the information processing.

It is noted that in the case where the game processing program and the like are used on a general-purpose platform, the game processing program may be provided under the condition that a standard program module provided on the platform is used. It is understood that even if a function corresponding to such a module as described above is excluded from the game processing program, the resultant game processing program substantially corresponds to the original game processing program as long as the module complements the excluded function.

It is noted that the aforementioned image processing performed on the non-player character Q1 is not prevented from being applied to a player character according to need.

The game processing system and the like illustrated in the illustrative embodiment are useable to make it easy for the player to recognize the state of the virtual object during the game processing.

While certain exemplary game processing systems, game processing methods, game processing apparatuses, and computer-readable storage media having game processing programs stored therein have been described herein, it is to be understood that the appended claims are not to be limited to the game processing systems, the game processing methods, the game processing apparatuses, and the computer-readable storage media disclosed, but on the contrary, are intended to cover various modifications and equivalent arrangements included within the spirit and scope of the appended claims.

What is claimed is:

1. A game system for performing game processing for a virtual space, the game system comprising:
    an operation processing section configured to control a player character in a virtual space on the basis of an operation of a player;
    a condition determination section configured to perform a determination of whether or not a positional relationship between the player character and a predetermined object meets a predetermined condition, wherein the predetermined condition is a condition of the predetermined object obscuring at least some of the player character based on the viewpoint from a virtual camera of the virtual space;
    at least one processor configured to adjust a collision boundary or region associated with the player character in accordance with the predetermined object obscuring at least some of the player character based on the viewpoint from a virtual camera of the virtual space; and
    an adjacency processing section configured to perform collision processing in accordance with the adjusted collision boundary or region associated with the player character.

2. The game system according to claim 1, wherein the condition determination section is further configured to determine whether or not the player character is close to the predetermined object.

3. The game system according to claim 1, further comprising a transparent processing section configured to increase transparency of the object on the basis of the performed determination.

4. The game system according to claim 1, further comprising a collision determination section configured to determine that a collision has occurred between the player character and the object in accordance with the performed collision processing.

5. The game system according to claim 4, wherein the collision boundary or region is a predetermined shape, and
    the adjusted collision boundary or region increases a size of the predetermined shape.

6. The game system according to claim 1, wherein the predetermined object is an enemy object.

7. The game system according to claim 1, wherein the operation processing section is further configured to control a plurality of player characters on the basis of operations of a plurality of players.

8. A game processing method for performing game processing on a processing system that includes at least one processor, the game processing method comprising:
    controlling a player character in a virtual space on the basis of an operation of a player;
    determining, via the processing system, whether or not the player character is at least partially hidden by a virtual object of the virtual space based on a view from a virtual camera;
    performing collision determination processing to determine whether or not a collision occurs with respect a first collision area associated with the player character based on determining that the player character is at least partially hidden by the virtual object; and
    performing collision determination processing to determine whether or not a collision occurs with respect to a second collision area associated with the player character in accordance with determining that the player character is not at least partially hidden by the virtual object, where the second collision area is different from the first collision area.

9. The game processing method according to claim 8, wherein the determining includes determining whether or not the player character is close to the virtual object.

10. The game processing method according to claim 8, further comprising increasing transparency of the object on the basis of determining that the player character is at least partially hidden by the virtual object.

11. The game processing method according to claim 8, further comprising determine that a collision has occurred between the player character and the virtual object in accordance with performed collision determination processing.

12. The game processing method according to claim 11, wherein first collision area and the second collision area are predetermined shapes with the first collision area being larger in size than the second collision area.

13. The game processing method according to claim 8, wherein the virtual object is an enemy object.

14. The game processing method according to claim 8, wherein the controlling includes a plurality of player characters that are controlled on the basis of respective input operations from a plurality of players.

15. A non-transitory storage medium storing computer executable instructions for use by a processing system that includes at least one processor, the stored instructions comprising instructions, when executed by the processing system, configured to:
    display a view, to a display device, of a virtual game space that includes the first virtual object and another virtual object as viewed from a virtual camera;

determine that the first virtual object is at least partially obstructed, as viewed from the virtual camera, by the another virtual object located in the virtual game space;

adjust a collision boundary or region that is associated with the first virtual object located in the virtual game space in accordance with the determination that the first virtual object is at least partially obstructed; and perform collision determination processing in accordance with the adjusted collision boundary that is associated with the first virtual object.

16. The medium of claim 15, wherein:

the first virtual object is a first user controlled virtual object that is controllable by user provided input, the another virtual object is a non-user controlled object, and the collision boundary or region that is associated with the first user controlled virtual object is not adjusted based on a second user controlled object obstructing the first user controlled virtual object as viewed from the virtual camera.

17. A game processing method for performing game processing on a processing system that includes at least one processor, the game processing method comprising:

controlling a player character in a virtual space on the basis of an operation of a player;

determining, via the processing system, whether or not the player character is at least partially hidden by a virtual object of the virtual space based on a view from a virtual camera;

performing collision determination processing with respect to a first collision area, which is associated with and applied in accordance with movement of the player character, based on determining that the player character is at least partially hidden by the virtual object; and performing collision determination processing with respect to a second collision area, which is associated with and applied in accordance with movement of the player character, based on determining that the player character is not at least partially hidden by the virtual object, where the second collision area is different from the first collision area.

* * * * *